United States Patent
Hazra et al.

(10) Patent No.: US 7,580,364 B2
(45) Date of Patent: Aug. 25, 2009

(54) APPARATUS, SYSTEM AND METHOD CAPABLE OF RECOVERING FROM DISJOINT CLUSTERS IN AN MESH NETWORK

(75) Inventors: Mousumi Hazra, Beaverton, OR (US); Mustafa Demirhan, Hillsboro, OR (US); Nandakishore Kushalnagar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1003 days.

(21) Appl. No.: 11/067,211

(22) Filed: Feb. 25, 2005

(65) Prior Publication Data

US 2006/0193334 A1   Aug. 31, 2006

(51) Int. Cl.
*H04L 12/26* (2006.01)
*H04L 12/28* (2006.01)
*H04W 24/00* (2009.01)
*H04W 4/00* (2009.01)

(52) U.S. Cl. .................. 370/252; 370/255; 455/423; 455/434

(58) Field of Classification Search ................. None
See application file for complete search history.

(56) References Cited

U.S. PATENT DOCUMENTS

| | | |
|---|---|---|
| 2004/0077374 A1* | 4/2004 | Terry .................. 455/552.1 |
| 2005/0010531 A1 | 1/2005 | Baumberger et al. |
| 2005/0085259 A1 | 4/2005 | Yang et al. |
| 2005/0129051 A1 | 6/2005 | Yang et al. |
| 2005/0239411 A1 | 10/2005 | Conner et al. |
| 2005/0245269 A1 | 11/2005 | Qi et al. |
| 2005/0262082 A1 | 11/2005 | Tharappel et al. |
| 2006/0002349 A1 | 1/2006 | Demirhan |
| 2006/0014536 A1 | 1/2006 | Kushalnagar et al. |
| 2006/0045064 A1 | 3/2006 | Hazra et al. |
| 2006/0075014 A1 | 4/2006 | Tharappel et al. |
| 2006/0120303 A1 | 6/2006 | Yarvis et al. |

OTHER PUBLICATIONS

Pending U.S. Appl. No. 11/043,478; Inventors: Kushalnagar et al.; filed Jan. 25, 2005.
Pending U.S. Appl. No. 11/089,888; Inventors: Kushalnagar et al.; filed Mar. 24, 2005.
Pending U.S. Appl. No. 11/067,211; Inventors: Hazra et al.; filed Feb. 25, 2005.
Pending U.S. Appl. No. 11/239,541; Inventors: Demirhan et al.; filed Sep. 28, 2005.
Pending U.S. Appl. No. 11/087,257; Inventors: Krishnaswamy et al.; filed Mar. 23, 2005.

(Continued)

*Primary Examiner*—Edan Orgad
*Assistant Examiner*—Sori A Aga
(74) *Attorney, Agent, or Firm*—James S. Finn; Intel Corporation

(57) ABSTRACT

An embodiment of the present invention provides an apparatus, comprising a transceiver capable of recovering from disjoint clusters in a mesh network by adding an additional Extended Service Set number (ESS Number) information element (IE) in the Beacon and Probe Response frames in at least one access point (AP) in said mesh network and all newly joining APs performing a scan of all channels to detect what channel the extended service set (ESS) is running on its ESS Number and putting this ESS number into their beacons Probe responses.

20 Claims, 2 Drawing Sheets

OTHER PUBLICATIONS

Pending U.S. Appl. No. 11/106,185; Inventors: Demirhan et al.; filed Apr. 13, 2005.
Pending U.S. Appl. No. 11/128,844; Inventors: Qi et al.; filed May 13, 2005.
Pending U.S. Appl. No. 11/205,857; Inventors: Hazra et al.; filed Aug. 17, 2005.
Pending U.S. Appl. No. 11/171,577; Inventors: Demirhan et al.; filed Jun. 30, 2005.
Pending U.S. Appl. No. 11/339,456; Inventors: Hazra et al.; filed Jan. 25, 2006.
Pending U.S. Appl. No. 11/018,850; Inventors: Metzler et al.; filed Dec. 21, 2004.
Pending U.S. Appl. No. 11/096,806; Inventors: Chhabra et al.; filed Mar. 31, 2005.
Pending U.S. Appl. No. 11/050,997; Inventors: Kushalnagar et al.; filed Feb. 4, 2005.
Pending U.S. Appl. No. 11/395,730; Inventors: Kushalnagar et al.; filed Mar. 31, 2006.

* cited by examiner

APPARATUS, SYSTEM AND METHOD CAPABLE OF RECOVERING FROM DISJOINT CLUSTERS IN AN MESH NETWORK

BACKGROUND

Wireless communications using wireless devices has become prevalent throughout society creating the need for faster, more reliable with greater range wireless communication techniques. A mesh network is a network of wireless devices that operate in a multi hop manner to extend wireless range and provide robust connectivity. An Extend Service Set (ESS) Mesh network may include a wireless mesh of several access points (APs) and clients. All devices, APs and clients, in an ESS mesh network may operate using the same ESSID and for single radio devices, all APs and clients may communicate with each other on the same operating channel, which forms the backbone of the network. Due to wireless network conditions, these devices may end up using different transmission frequencies, resulting in a set of disjoint network clusters. Nodes of one cluster may not be able to communicate with nodes of other clusters, thereby reducing the efficiency and robustness of the ESS mesh network.

Thus, a strong need exists for a system, apparatus and method capable of improved wireless communication techniques using mesh networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
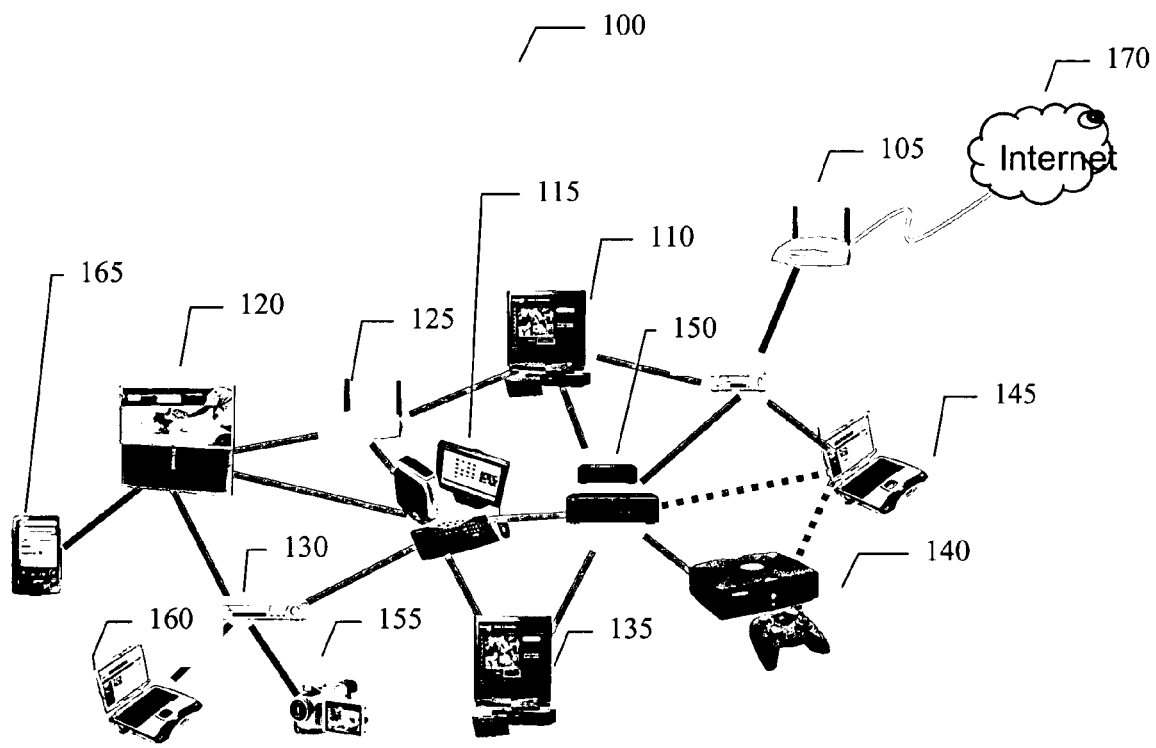
FIG. 1 illustrates an ESS Mesh network with APs using the same channel for the backbone.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like) and sensor networks.

Existing solutions for self-configuring the transmission channel of a mesh network in general and an ESS mesh network in particular does not address the issue of dealing with the problem of unifying clusters of nodes with the same ESSID but on different channels. However due to dynamic variation in the wireless network, such clustering is possible. FIG. 1, generally at 100, illustrates an ESS Mesh network with APs using the same channel for the backbone. This mesh network is a network of wireless devices 105-165 that operate in a multi hop manner to extend wireless range and provide robust connectivity to, for example, Internet 170 (although the present invention is not limited to Internet connectivity). One example of the benefits of the present invention would be in overcoming a rogue jammer jamming a channel, making exchange of self-configuration messages impossible, thereby causing some nodes (for example 120 and 130) to switch to a different channel without having the others (such as 110 and 145) switch as-well.

An embodiment of the present invention provides an apparatus, system and method of automatically unifying clusters having the same ESSID but operating on different channels within an ESS mesh network. The clusters may be created due to dynamic changes in the wireless environment. These clusters may operate with the same ESSID but on different channels, there-by preventing communication between devices in the different clusters, reducing the efficiency and robustness of ESS mesh networks. An embodiment of the present invention provides an efficient, minimal overhead solution of unifying these clusters whereby the devices in the ESS mesh network coordinate with each other to ensure a unique transmission channel for its backbone to ensure a fully connected, robust ESS mesh network. The present apparatus, system and method may be distributed, dynamic and adaptable to a changing wireless environment.

Illustrated generally with reference to steps 1-5 below, in accordance with an embodiment of the present invention, are steps for cluster unification that may be used by the system, apparatus and method of one embodiment of the present invention. Although an embodiment of the present invention is illustrated for the ESS Mesh network, it is understood that the same method will be applicable for an ad-hoc mesh of nodes running with the same SSID, and the present invention is not limited to ESS Mesh networks or any particular network in general.

Step 1: Under normal operation 205, each AP needs to add an additional information element (IE) called ESS Number IE in the Beacon and Probe Response frames. If an AP detects that it is the first AP of the ESS mesh network, the AP may choose its own MAC address as the ESS number and add this number within its beacon as the ESS Number IE. All newly joining APs may perform a scan of all channels to detect what channel the ESS is running on and what its ESS Number is. These APs may put this ESS number into their beacons and also add this IE in their Probe responses. In an embodiment of the present invention, the aim may be to have all APs in the ESS mesh network operate on the same channel and broadcast the same ESSID as well as the same ESS number in their Beacons. Choosing the MAC address as the ESS Mesh number avoids duplication, although the present invention is not limited in this respect.

Step 2: An ESS Mesh network may need to detect disjoint clusters by performing fast channel scans and in an embodiment of the present invention, any AP in the network may perform this scan. To exemplify, an example choice of nodes may be, although is not limited to be:

a. A newly joining AP during the initial scan detects two or more clusters of networks with the same ESSID running on different channels.

b. APs may opt to perform fast scans to determine network conditions at any time it finds itself idle—it can choose to do fast channel scans to detect network conditions (including disjoint ESS mesh clusters). This will ensure that somebody will detect the partitioned network.

The AP may perform a scan of all channels to determine if nodes with same ESSID as itself exist in more than one channel or not. If not, it does nothing. If yes, it proceeds to step 3.

Step 3: During the scan, the AP may create a table of network transmission channels and ESS numbers for the same ESSID networks. When an AP detects that different clusters exist with the same ESSID, it may first look at the ESS Number of the different clusters. If it detects clusters exist but all clusters have the same ESS number, it may perform step 5, else it performs step 4.

Step 4: In step 4, the cluster with the smallest ESS Number may be selected as the parent cluster and if the node detects that it is not the parent cluster, then it may initiate a channel change process which sends out a self-configuration change channel request with the channel of the parent cluster and the corresponding ESS Number. If it is an already operational AP, the channel change message may be sent out in its current operating channel. A newly joining AP may send the channel change request in all channels with detected clusters and then pick the channel of the parent cluster as its own operating channel. Every AP that receives this message may set their new ESS number, forward this packet, and then change its channel if necessary.

If the node detects that it is a member of the parent cluster, it may start a cluster detect timer; when this timer expires the node may check if all clusters have joined this parent cluster (i.e. a single ESS mesh network with the same ESSID and ESS Number exists). If the AP detects that a cluster still exists, it could mean that the other network cannot detect the clustering (either due to jamming or due to asymmetric links). In this case, the network with the smaller ESS number should switch its channel as described above.

Step 5: If a node detects two or more clusters with the same ESS number, it first may run a new ESS Number selection algorithm for its cluster. This algorithm may be a simplified version of a leader-election algorithm. The leader election algorithm is run to select a leader and the elected leader sends out a self-configuration message with its Mac address as the new ESS number for its cluster. This will result in different clusters with the same ESSID and different ESS Numbers. At this point, steps in 2, 3 and/or 4 above may be used to unify the entire network.

Figure 2:
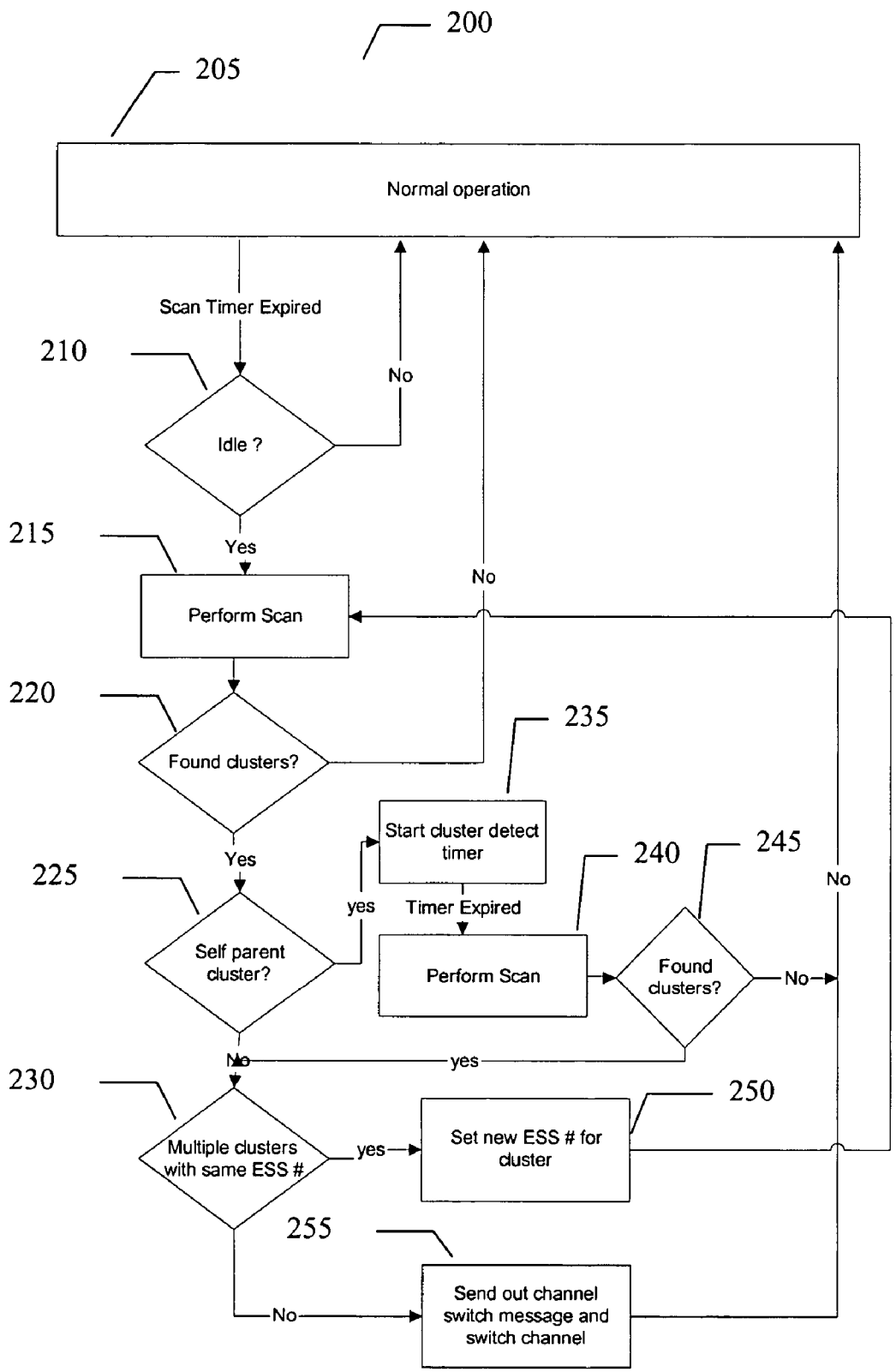
FIG. 2 is a flow chart for cluster unification used by the system, apparatus and method of one embodiment of the present invention.

Turning now to FIG. 2, illustrated generally at 200, in accordance with an embodiment of the present invention is a flow chart for cluster unification that may be used by the system, apparatus and method of one embodiment of the present invention. Starting in normal operation 205, after scan timer expires, a determination may be made at 210 if the AP is idle or not. If no, a return to 205 may be accomplished and if yes, a scan may be performed at 215. Next at 220, a determination if clusters are found is accomplished and if no, a return to 200 is accomplished, but if yes, it is determined if it is the parent cluster at 225. If it is, at 235 the cluster detect timer is started and after the timer has expired, at 240 a scan is performed and if no clusters are found at 245, a return to 200 may be accomplished. If clusters are found, a determination may be made at 230 if there are multiple clusters with the same ESS number. If no at 230, a channel switch message may be sent out and the channel may be switched and a return to 200 may be accomplished. If yes at 230, set new ESS number for cluster and return to 215. Returning now to step 225, if it is not the parent the flow proceeds to step 230.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus, comprising:
a transceiver configured to communicate with at least one access point (AP) in a mesh network and adapted to recover from disjoint clusters in said mesh network by detecting disjoint clusters by performing fast channel scans and adding an Extended Service Set (ESS) number information element (IE) in Beacon and/or Probe Response frames such that all APs in an ESS mesh network operate on the same channel and broadcast a same ESSID as well as a same ESS number in their Beacons;
wherein during said scan, each AP creates a table of network transmission channels and ESS numbers for said same ESSID networks and when an AP detects that different clusters exist with said same ESSID, it first looks at an ESS Number of different clusters; and
wherein a cluster with a smallest ESS Number is selected as a parent cluster and if a node detects that it is not said parent cluster, then it initiates a channel change process which sends out a self-configuration change channel request with a channel of said parent cluster and corresponding ESS Number.

2. The apparatus of claim 1, wherein if a node detects two or more clusters with a same ESS number, it first runs a new ESS Number selection algorithm for its cluster.

3. The apparatus of claim 2, wherein if said at least one AP in said mesh network detects that it is the first AP of said ESS mesh network, said at least one AP chooses its own MAC address as the ESS number and adds this number within its beacon as the ESS Number IE.

4. The apparatus of claim 3, wherein any AP in said ESS Mesh network performs fast channel scans to detect disjoint clusters.

5. The apparatus of claim 4, wherein said AP performing said fast scan is any newly joining AP during an initial scan which detects two or more clusters of networks with the same ESSID running on different channels or any APs to determine network conditions at any time it finds itself idle.

6. The apparatus of claim 1, wherein if a node detects that it is not the parent cluster, it initiates a channel change process by sending out a self-configuration change channel request with the channel of the parent cluster and the corresponding ESS Number, and if it is an already operational AP, the channel change message is sent out in its current operating channel, and wherein a newly joining AP is capable of sending the channel change request in all channels with detected clusters and picking the channel of the parent cluster as its own operating channel, and every AP that receives this message sets their new ESS number, forwards this packet, and then changes its channels if necessary.

7. The apparatus of claim 5, wherein if a node detects that it is a member of the parent cluster, it starts a cluster detect timer and when this timer expires, the node checks if all clusters have joined this parent cluster and if the AP detects that some cluster still exists, the network with the smaller ESS number switches its channel.

8. The apparatus of claim 4, further comprising an ESS Number selection algorithm that is a leader-election algorithm to select a leader and wherein the elected leader sends out a self-configuration message with its Mac address as the new ESS number for its cluster.

9. A method of recovering from disjoint clusters in a mesh network, comprising:
adding an additional Extended Service Set number (ESS Number) information element (IE) in the Beacon and Probe Response frames in at least one access point (AP) in said mesh network,
performing a scan by all newly joining APs of all channels to detect what channel the extended service set (ESS) is running on and its ESS Number, wherein said APs put said ESS number into their beacons Probe responses; and
wherein during said scan, each AP creates a table of network transmission channels and ESS numbers for the same ESSID networks and when an AP detects that different clusters exist with the same ESSID, it first looks at an ESS Number of different clusters; and
wherein a cluster with the smallest ESS Number is selected as a parent cluster and if a node detects that it is not said parent cluster, then it initiates a channel change process which sends out a self-configuration change channel request with a channel of said parent cluster and corresponding ESS Number.

10. The method of claim 9, further comprising choosing its own MAC address as the ESS number if said newly joining AP is the first AP of said ESS mesh network, and adding this number within its beacon as the ESS Number IE.

11. The method of claim 9, further comprising initiating a channel change process by sending out a self-configuration change channel request with the channel of the parent cluster and the corresponding ESS Number if a node detects that it is not the parent cluster, and if it is an already operational AP, sending out the channel change message in its current operating channel.

12. The method of claim 11, further comprising sending, by a newly joining AP, the channel change request in all channels with detected clusters and then picking the channel of the parent cluster as its own operating channel and wherein every AP that receives this message sets their new ESS number, forwards this packet, and then changes its channels if necessary.

13. The method of claim 9, further comprising detecting if a node is a member of the parent cluster and if so starting a cluster detect timer and when this timer expires, checking by said node if all clusters have joined this parent cluster and if said node detects that some cluster still exists, the network with the smaller ESS number switches its channel.

14. The method of claim 13, further comprising running a new ESS Number selection algorithm for its cluster if all of said clusters do not have the same ESS number.

15. The method of claim 14, further comprising adapting said ESS Number selection algorithm to be capable of using a leader-election algorithm to select a leader and wherein the elected leader sends out a self-configuration message with its Mac address as the new ESS number for its cluster.

16. An article, comprising:
  a storage medium having stored thereon instructions, that, when executed by a computing platform results in:
  recovering from disjoint clusters in a mesh network by adding an additional Extended Service Set number (ESS Number) information element (IE) in the Beacon and Probe Response frames in at least one access point (AP) in said mesh network and performing a scan by all newly joining APs of all channels to detect what channel the extended service set (ESS) is running on and its ESS Number, and putting said ESS number into their beacons Probe responses by said AP;
  wherein during said scan, each AP creates a table of network transmission channels and ESS numbers for the same ESSID networks and when an AP detects that different clusters exist with the same ESSID, it first looks at an ESS Number of different clusters; and
  wherein a cluster with the smallest ESS Number is selected as a parent cluster and if a node detects that it is not said parent cluster, then it initiates a channel change process which sends out a self-configuration change channel request with a channel of said parent cluster and corresponding ESS Number.

17. The article of claim 16, further comprising instructing choosing its own MAC address as the ESS number, if it said newly joining AP is the first AP of said ESS mesh network, and adding this number within its beacon as the ESS Number IE.

18. The article of claim 17, further comprising instructing and controlling the performance of fast channel scans to detect disjoint clusters by any AP in said ESS Mesh network.

19. The article of claim 18, wherein said AP performing said fast scan is any newly joining AP during an initial scan which detects two or more clusters of networks with the same ESSID running on different channels or any APs to determine network conditions at any time it finds itself idle.

20. A system adopted to recover from disjoint clusters in a mesh network comprising:
  at least one access point (AP) in said mesh network adopted to add an additional Extended Service Set number (ESS Number) information element (IE) in the Beacon and Probe Response frames; and
  at least one additional AP capable of, when newly joining the system, performing a scan of all channels to detect what channel the extended service set (ESS) is running on its ESS Number and wherein said at least one additional AP puts said ESS number into its Beacon Probe responses;
  wherein during said scan, each AP creates a table of network transmission channels and ESS numbers for the same ESSID networks and when an AP detects that different clusters exist with the same ESSID, it first looks at an ESS Number of different clusters; and
  wherein a cluster with the smallest ESS Number is selected as a parent cluster and if a node detects that it is not said parent cluster, then it initiates a channel change process which sends out a self-configuration change channel request with a channel of said parent cluster and corresponding ESS Number.

* * * * *

UNITED STATES PATENT AND TRADEMARK OFFICE
CERTIFICATE OF CORRECTION

PATENT NO. : 7,580,364 B2 Page 1 of 1
APPLICATION NO. : 11/067211
DATED : August 25, 2009
INVENTOR(S) : Hazra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1217 days.

Signed and Sealed this

Fourteenth Day of September, 2010

David J. Kappos
*Director of the United States Patent and Trademark Office*